United States Patent [19]
Ishikawa et al.

[11] Patent Number: 4,840,142
[45] Date of Patent: Jun. 20, 1989

[54] APPARATUS FOR RAISING SMALL ANIMALS

[75] Inventors: Tetsushi Ishikawa, Okayama; Masato Okabe, Narita; Hiroyasu Kato, Tokyo, all of Japan

[73] Assignees: Kabushiki Kaisha Hayashibara Seibutsu Kagaku Kenkyujo, Okayama; Kabushiki Kaisha Itoki, Osaka, both of Japan

[21] Appl. No.: 110,409

[22] Filed: Oct. 20, 1987

[30] Foreign Application Priority Data

Oct. 20, 1986 [JP] Japan .................. 61-247472

[51] Int. Cl.$^4$ .................................................. A01K 31/00
[52] U.S. Cl. ............................................................ 119/17
[58] Field of Search .................. 119/15, 17, 22, 28

[56] References Cited

U.S. PATENT DOCUMENTS

| | | | |
|---|---|---|---|
| 3,119,373 | 1/1964 | Schmid | 119/22 |
| 3,662,714 | 5/1972 | Poon | 119/22 X |
| 3,704,688 | 12/1972 | Wilson | 119/22 |
| 3,978,819 | 9/1976 | Lovitt | 119/22 |
| 4,020,793 | 5/1977 | Morrison | 119/22 X |
| 4,085,705 | 4/1978 | Gland et al. | 119/17 |
| 4,249,482 | 2/1981 | Harr | 119/17 |
| 4,690,100 | 9/1987 | Thomas | 119/15 |

FOREIGN PATENT DOCUMENTS

| | | | |
|---|---|---|---|
| 2569526 | 3/1986 | France | 119/15 |
| 554062 | 5/1957 | Italy | 119/15 |

Primary Examiner—Gene Mancene
Assistant Examiner—R. Thomas Price
Attorney, Agent, or Firm—Schwartz & Weinrieb

[57] ABSTRACT

An apparatus having a plurality of rack members provided within a plurality of longitudinally spaced frames, a plurality of cages suspended from the rack members, and a plurality of dung and food conveyor belts. The frame comprise stands spaced along the longitudinal direction of the apparatus, a post mounted on each of the stands at a central portion with respect to the lateral direction of the apparatus, and cantilevered brackets secured to each post so as to project in laterally opposite directions. The rack members are secured to the cantilevered brackets so as to form a plurality of racks.

20 Claims, 9 Drawing Sheets

| FIG.6A | FIG.6B |

FIG. 7

APPARATUS FOR RAISING SMALL ANIMALS

BACKGROUND OF THE INVENTION

The present invention relates to an apparatus for raising small animals as used in experiments, and more particularly to a rack device for mounting cages for confining small animals.

Conventional rack devices for raising small animals have various disadvantages which are known in the prior art. For example, the frame for the rack device usually comprises vertical posts at the four corners of the device, lateral bars secured between the corresponding posts, and longitudinal beams secured to the posts and bars, thereby forming the racks. Cages are suspended from the longitudinal beams. In such a rack device, the posts are provided at both longitudinal ends, which places obstacles in the way of access to the cages, and obstructs the handling of the cages, particularly the setting up and removal of the cages.

A belt conveyer is provided on each longitudinal beam which serves as a rack plate, in order to remove the remains of foods and excrement which drop from upper cages. The conveyer is disposed such that the belt slides upon the surface of the rack plate. However, the surface of the rack plate is made of a plurality of members which are welded together with respect to each other. Accordingly, many manufacturing steps are required to form the surface. In addition, the irregular surface causes increased friction for the belt.

Furthermore, it is difficult to detach and attach the rack plate and the belt conveyer, since the rack plate is secured to the lateral bars which are secured to oppositely disposed posts.

The belt conveyer is driven by means of a motor through means of a chain driving mechanism. The chain driving mechinism is complicated in construction and occupies a large amount of space. Generally, the motor os disposed at a position which is above the uppermost rack plate. Accordingly, the height of the motor mounting portion of the apparatus becomes large compared with other portions thereof, which renders the installation of a feeding system on the top of the apparatus difficult.

Further, the belt of the conveyer is washed at an end of the apparatus. However, in the conventional apparatus, the belt is not sufficiently cleaned.

OBJECT OF THE INVENTION

The object of the present invention is to provide an apparatus for raising small animals which may eliminate the above described disadvantages characteristic of the prior art.

SUMMARY OF THE INVENTION

According to the present invention, there is provided an apparatus for raising small animals which has a plurality of rack members provided within a frame, a plurality of cages suspended from the rack members, and a dunging belt conveyer. The frame comprises a plurality of stands spaced apart in the longitudinal direction of the apparatus, a post mounted on each of the stands at a central portion with respect to the lateral direction of the apparatus, cantilevered arms or brackets secured to each post so as to project in laterally opposite directions and arranged to form a plurality cantilevered arms or brackets. The rack members are secured to the cantilevered arms or brackets so as to form a plurality of racks. The apparatus has means for cleaning the belt of the dunging belt conveyer.

In accordance with an aspect of the present invention, each rack member spans the distance defined between, the cantilevered arms or brackets, and is formed by bending a steel plate so as to form a bottom plate, side plates upwardly bent at lateral opposite ends of the bottom plate, and a pair of overhung slides formed upon the side plates, the belt of the belt conveyer being arranged to slide upon the slides and the bottom plate. The rack member is detachably mounted upon the cantilevered arms or brackets. The apparatus includes a belt drive motor which is provided within one of the pulleys so as to drive the pulley. The cleaning means includes a nozzle which is provided to inject liquid cleaner onto the belt, and the nozzle defines an injection projection plane which has a rectangular configuration.

BRIEF DESCRIPTION OF THE DRAWINGS

These and other objects and features of the present invention will become more apparent from the following detailed description with reference to the accompanying drawings in which like reference characters designate like or corresponding parts throughout the several views, and wherein.

DETAILED DESCRIPTION OF THE PREFERRED EMBODIMENT

Figure 2:
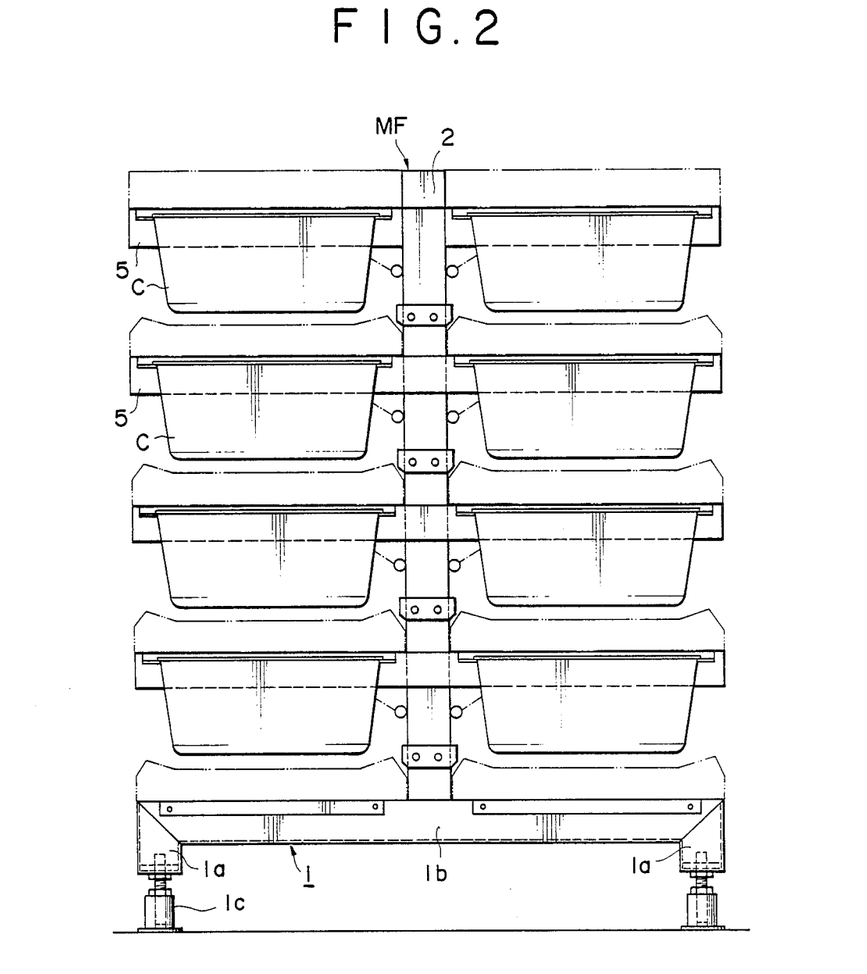
FIG. 2 is a side view of a main frame.

Referring to FIG. 2, a stand 1 having a gantrylike-shape has a pair of legs 1a, 1a and a lateral base bar 1b disposed between legs 1a, 1a. A post 2 is vertically mounted on the base bar 1b at the center thereof. The stand 1 and the post 2 constitute a main frame MF. Reference numeral 1c designates an adjuster for adjusting the height of the main frame MF.

Figure 1:
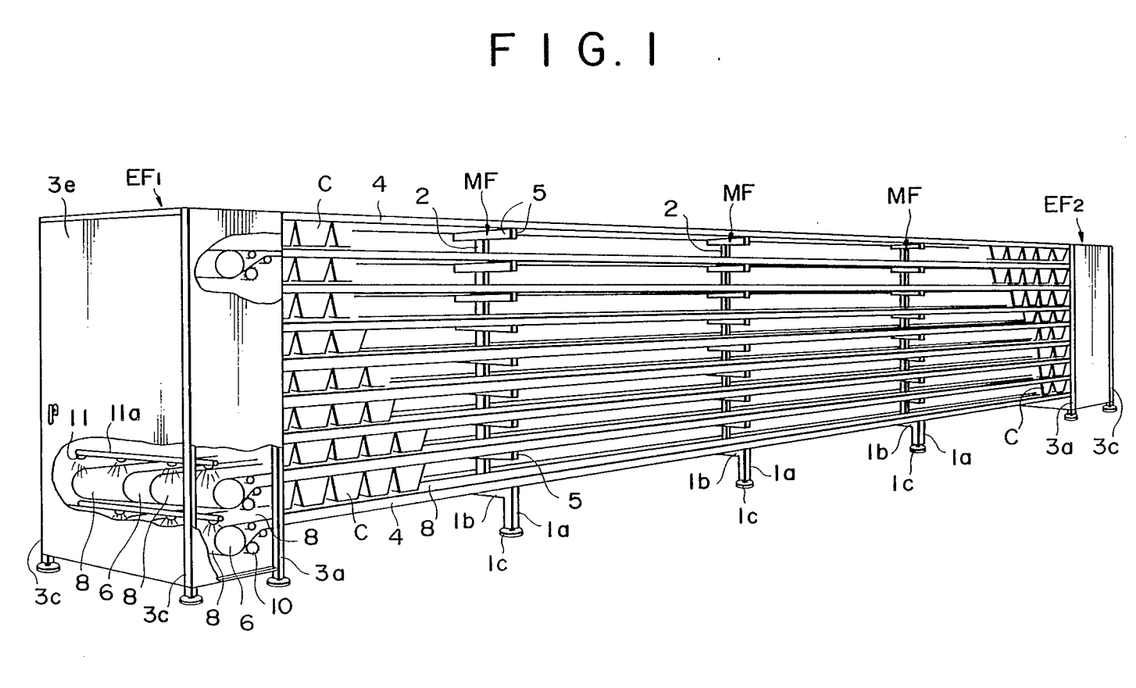
FIG. 1 is a schematic perspective view showing an apparatus according to the present invention, in which a part of the apparatus is cut away.

The apparatus shown in FIG. 1 of the present invention consists of three main frames MF which are equidistantly spaced with respect to each other in the longitudinal direction, and a pair of end frames EF1 and EF2. However, the number of main frames can be appropriately selected in accordance with the length of the apparatus.

Referring to FIGS. 5 and 6, the end frame EF1 (EF2) comprises a pair of posts 3a, 3a provided at positions corresponding to those legs 1a, 1a of the main frame MF, a center post 3b interposed between the posts 3a, 3a, and corresponding in position to the post 2 of the main frame MF, and a pair of posts 3c, 3c which also correspond in position to the parts 3a, 3a. A side panel 3d is provided between each pair of posts 3a and 3c.

Rack members 4 mounted on the post 2 upon opposite sides thereof will now be described.

Figure 3:
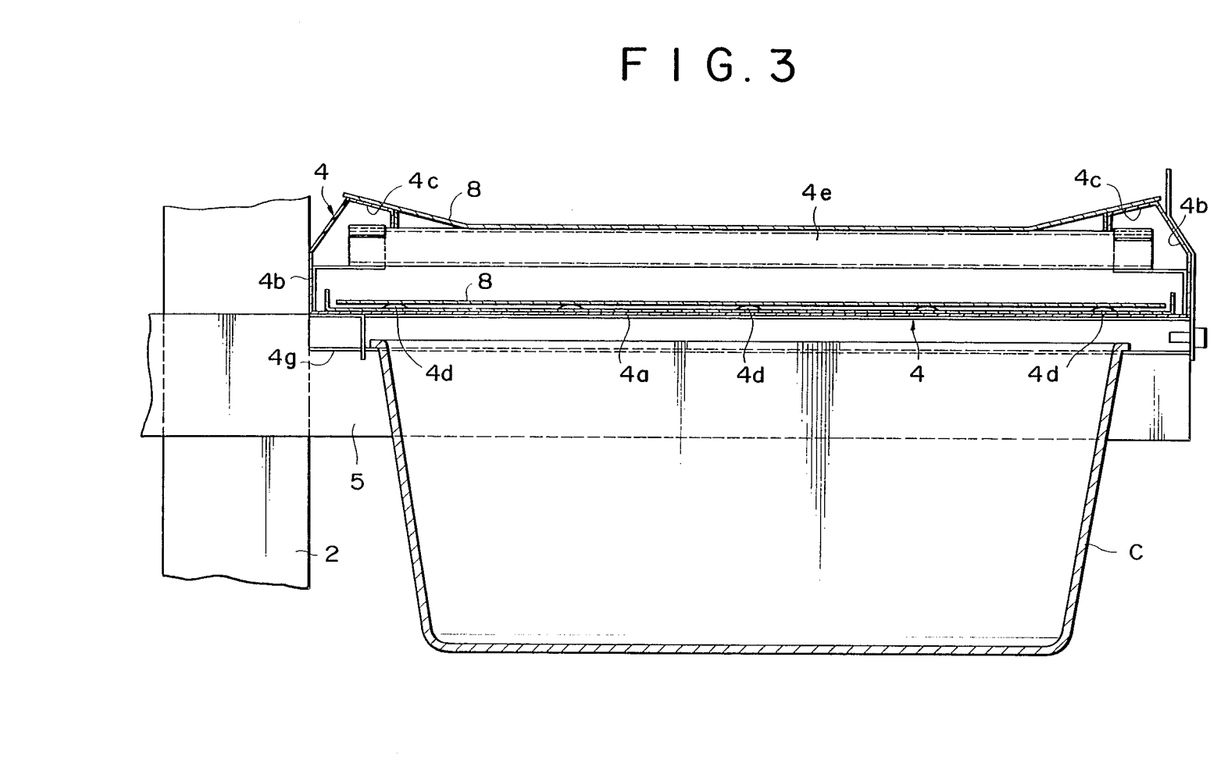
FIG. 3 is an enlarged side view showing a part of FIG. 2, in section.
Figure 4:
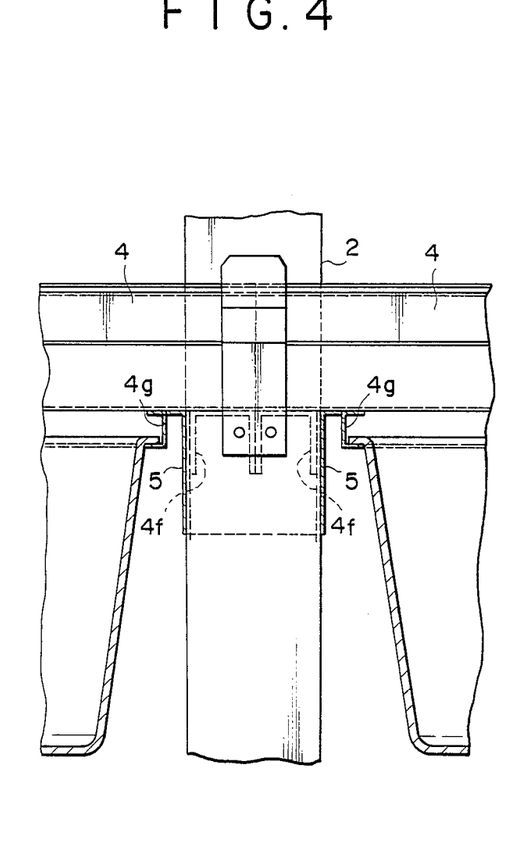
FIG. 4 is an enlarged front view showing an engaging portion of a cantilevered bracket and rack members.
Figure 5:
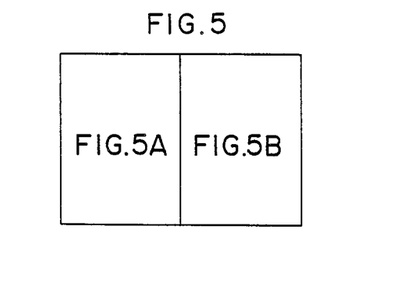
FIG. 5a and 5b is a front view of the apparatus, in which some parts are removed.
Figure 5A:
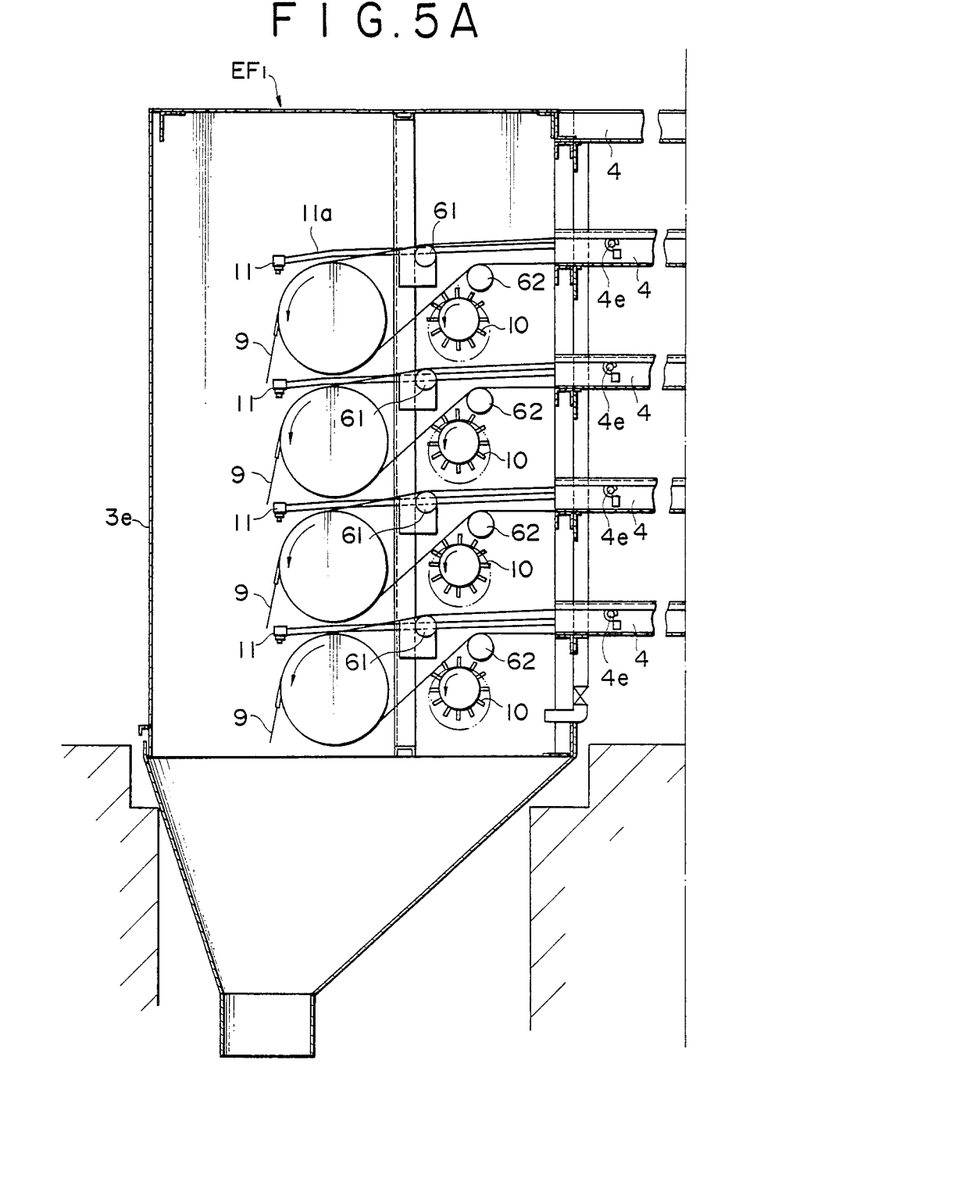

Referring to FIG. 3, each rack member 4 is made from a steel plate having a longitudinally elongated rectangular shape and is arranged to span the distance longitudinally spaced brackets 5 secured to longitudinally spaced posts 2. The rack member 4 includes a bottom plate 4a, a pair of side plates 4b, 4b bent upwardly at an angle of 90 degrees at the lateral opposite sides of the bottom plate 4a, and a pair of overhung slide portions 4c, 4c bent inwardly at the upper portions of the side plates 4b, 4b, each forming a downwardly slanted slide for an upper flight of a conveyor belt 8, which will be described more fully hereinafter. The bottom plate 4a has a plurality of projections 4d projection upwardly therefrom, each projection having a sperical top for receiving and supporting the flight of the belt 8. A plurality of pipes 4e for supporting the upper flight of the belt are secured between the side plates 4b, 4b. Each pipe 4e is detachably attached to the side plate by means of hooks each having a C-shaped section, the opening of which is disposed opposite the traveling direction of the belt 8 as shown in FIG. 5. A pair of engaging members 4f, having an inverted channel-shaped section is secured to the underside of the bottom plate 4a at opposite end portions of the rack member 4 as viewed in the longitudinal direction thereof for attaching the rack member 4 to the brackets 5 of all the main frame MF as best seen in FIG. 4. A pair of opposed rails 4g, each having a C-shaped section, are provided under the bottom plate 4a for mounting a cage C upon the rack member 4. A plurality of opposed pairs of rails 4g are disposed, at a pitch distance equal to the width of the cages C, along the longitudinal direction of the rack member 4 so as to support a plurality of cages C upon each rack member 4.

In order to mount each rack member 4 upon each main frame MF, a plurality of vertically spaced brackets 5 having cantilevered or free end are secured to each post 2 of each main frame MF. Each bracket 5 projects laterally from the post 2 in opposite directions. Each cantilevered bracket 5 comprises a pair of beam members each having an L-shaped section, the shorter legs of which extend in opposite directions. Two beam members are symmetrically disposed and secured to opposite sides of each post 2 so as to form an opening within the upper portion of each cantilevered bracket 5. A lateral beam 51 having a U-shaped section is secured to the posts 3a, 3a of each end frame EF1 (EF2). Accordingly, by connecting each of the engaging members 4f of each rack member 4 with each of the opposite brackets 5, or with the bracket 5 and the lateral beam 51, the rack members 4 are detachably mounted between the main frames MF, and between the main frame MF and each end frame EF1 (EF2).

As described above, each rack member 4 has a length which is approximately equal to the span defined between successive posts 2 of adjacent main frames MF. Thus, the longitudinal end of each rack member 4 are positioned upon each of the cantilevered brackets 5 of each main frame MF or one end of each rack member 4 is located upon the beam 51 of the end frame EF1. Furthermore, adjacent rack mambers 4 are adapted to be joined upon each cantilevered bracket 5 by means of suitable fastening plates. Two rack members 4 are also of course mounted upon laterally oppositely extending catilevered brackets 5 of each post 2.

Figure 6:
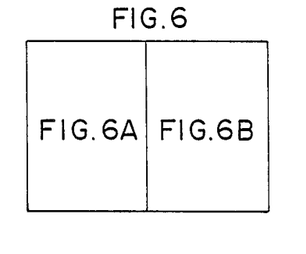
FIG. 6a and 6b is a plan view of the apparatus of FIG. 5.
Figure 6A:
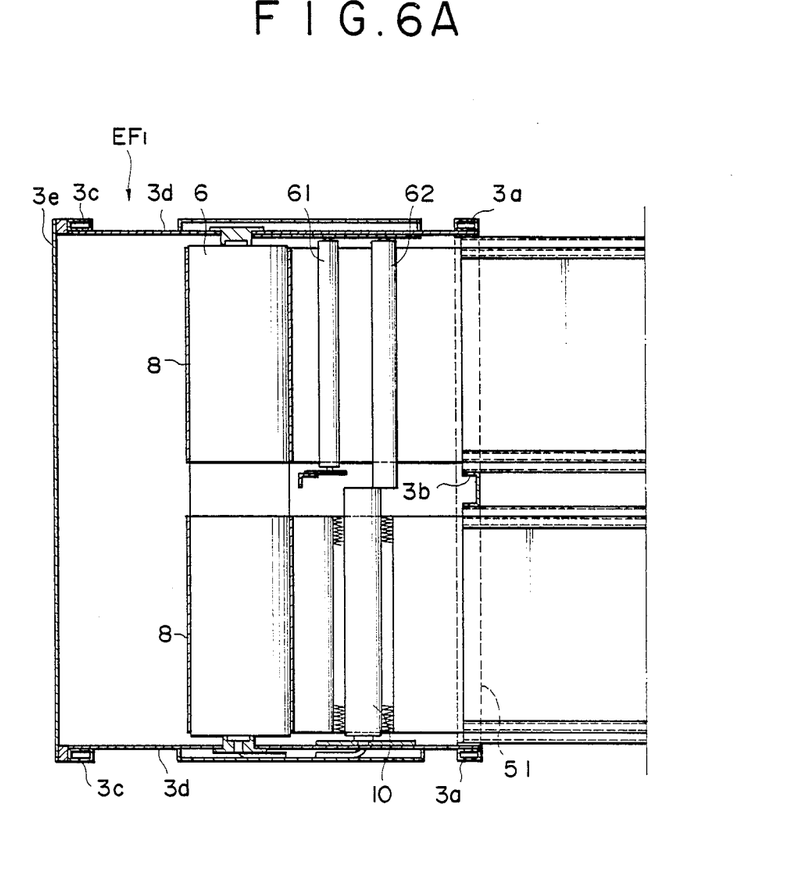

A plurality of cylindrical drive pulleys 8 for supporting and driving a pair of pulley belts are individually mounted upon the side panels 3d, 3d of the end frame EF1 so as to correspond with one longitudinal end of each row of the rack member 4, as best seen in FIG. 6a. A pair of cylindrical return pulleys 7 is rotatably mounted upon the end frame EF2 so as to correspond with the other longitudinal end of each row of rack members 4. Each of the drive pulley motors 6 has a length corresponding to the lateral width of the apparatus.

Figure 6B:
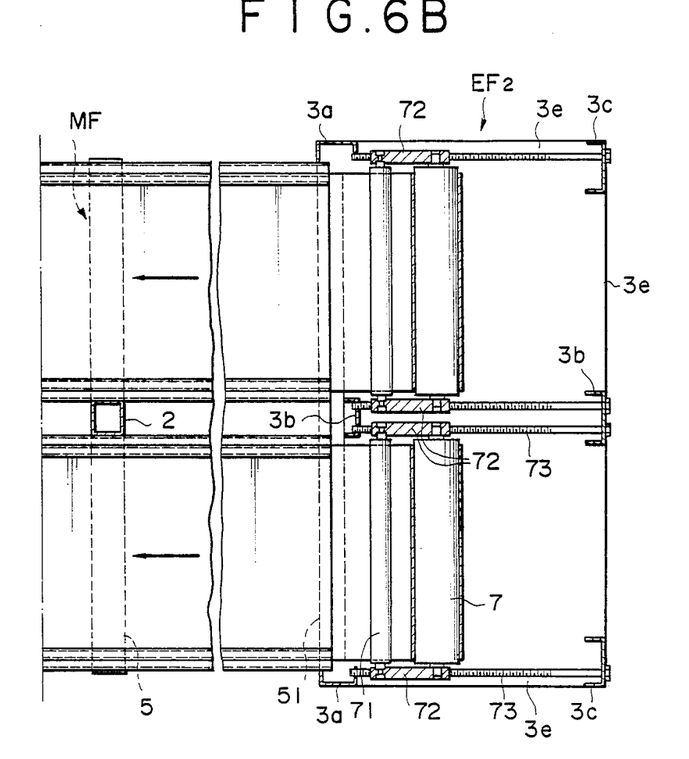

As shown in FIG. 6b, the return pulleys 7 are mounted between two pairs of bearing support plates 72 engaged with screw rods 73 which are supported upon the end frame EF2. The laterally outer screw rods 73 are secured to the posts 3a, 3b while the laterally inner screw rods 73 are secured to the posts 3b, 3c, respectively.

Each drive pulley 6 is provided with a drive motor (not shown) disposed within each cylindrical pulley 6 for rotating each drive pulley 6. The outer periphery of each drive pulley 6 is finished with rubber or a synthetic resin so as to define a pair of laterally spaced strips which will operatively interface with a pair of pulley belts 8 and which will form respective crowning surface therefore for preventing the derailment of the belts and preventing the production of noise. The return pulleys 7 are individually formed to similarly correspond to each pulley belt 8.

Each dunging conveyer belt 8 is diposed around the drive pulley 6 and one of the return pulleys 7. Each belt 8 is slidably supported upon the rack member 4 so as to slide upon the slide portions 4c, 4c, pipes 4e, and projections 4d.

Figure 5B:
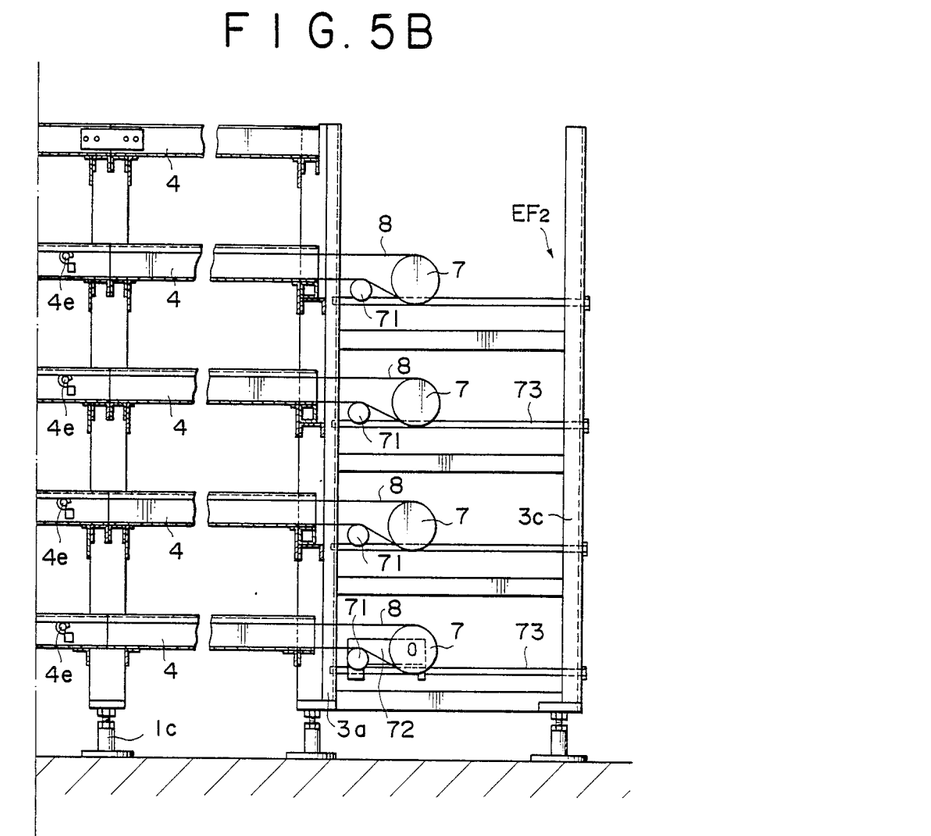

As shown in FIG. 5, since each drive pulley 6 is rotated in the counterclockwise direction, the upper tensioned Flight of each belt 8 is engaged with the slide portions 4c, 4c and the pipes 4e, while the slackened flight of each belt 8 is engaged with the projections 4d. Each conveyer belt 8 is further tensioned by means of tension pulleys 61, 62 secured between the side panels 3d, 3d of the end frame EF1 and by means of a tension pulley 71 secured between side panels 3c of end Frame EF. Furthermore, in order to clean each belt 8, a scraper 9 and a rolling brush 10 are mounted between panels 3d, 3d corresponding to each belt, respectively. The scraper 9 is provided in front of the drive pulley 6 while the rolling brush 10 is provided underneath each belt 8 at a position upstream of tension pulley 62.

Nozzles 11 are provided above each scraper 9 and are diposed toward the upper surface of each belt 8 engaged with each drive pulley 6 so as to clean each belt 8. As shown in FIG. 1, in the present embodiment, a pair of nozzles 11, 11 is disposed above each conveyer belt 8 so as to cover the lateral extent thereof. However, the number of nozzles is approximately set in accordance with the width of the belt.

Figure 7:
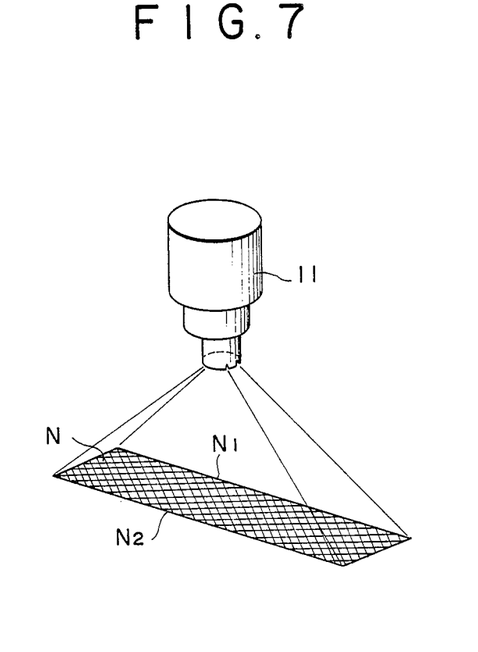
FIG. 7 is a perspective view showing a cleaning nozzle and a projection plane when the nozzle injects a cleaner.

Referring to FIG. 7, an outlet of each nozzle 11 is formed in such a manner that a plane N of the projection made by the injection of the liquid cleaner has an approximately rectangular configuration as seen view. As an example, the nozzle is provided with a pair of outlets formed adjacent to each other. Reference numeral 11a in FIG. 1. designates a conduit or manifold for supplying the cleaner to each nozzle 11.

Since the projected plane N has a rectangular configuration, the cleaner is projected onto the surface of each belt 8 at a uniform pressure with respect to the entire width of each belt. Furthermore, the nozzle 11 is positioned adjacent to the portion of each belt 8 which is engaged with each drive 6, so that the plane N of projection corresponds to a particular or predetermined length portion of each belt. Accordingly, course cleaning is perfromed at an inlet side N1 at a uniform pressure while finishing cleaning is performed at an outlet side N2 at a uniform pressure. Thus, a high degree of cleaning effeciency can be accomplished.

Each of the tension pulleys 71 is provided adjacent each of the return pulleys 7. These pulleys 7 and 71 of each row of the rack members 4 are pivotally mounted on the support plates 72. As described before, each support plate 72 engaged with the screw rod 73 oriented in the longitudinal direction of the apparatus. Thus, each plate 72 is longitudinally movable by rotating its associated screw rod 73 for adjusting the tension of the belt 8.

In the present invention, as shown in FIGS. 1, 2, and 3 the apparatus comprises the rack members 4 each of which has the cage attaching rails 4g provided under the bottom plate 4a thereof, each cage C, receiving small animals, being attached to the rails 4g at both sides of the upper portion of each cage C and supported under each rack member 4 in a suspended state, in the same manner as a conventional apparatus.

However, the apparatus of the present invention has remarkable advantages as follows.

In the present apparatus, each post 2 is secured upon the central portion of the stand 1 having a gantrylike—shape, and oppositely extending cantilevered brackets 5 are provided on the post 2, and the rack members 4 are detachably connected to each cantilevered bracket 5. Accordingly, there are no obstacles preventing the insertion and removal of the cages, such as for example, the outer side posts in the conventional apparatus.

Since each rack member is made from a steel plate by bending the same to its desired configuration, the manufacturing cost decreases as compared with convention 1 machining costs. Furthermore, the joints for the plates made by welding do not appear upon the slide surfaces of the rack members for the belts, so that the belts efficiently slide upon the slide surfaces. The sliding efficiency is enhanced by projections formed upon the bottom plate of each rack member. Since each rack member can be removed from the cantilevered brackets, disassembling and cleaning of the apparatus can be easily accomplished.

Furthermore, the belts travelling upon the rack members are driven by the drive pulleys which have their drive motors, not shown, inegrally provided therewith. Accordingly, there is no necessity for providing the drive motors separately, unlike the conventional apparatus. Therefore, the problem of the conventional apparatus that the motors protrude from the upper portion of the apparatus, which hinders provision of an automatic feeder, is resolved. Two conveyor belts are mounted on each rubber in the form of a crown. Thus, the belts are prevented from deflecting and a good soundproof effects are obtained.

The apparatus is employed with nozzles for cleaning the belts which exhibit a rectangular projection pattern when the cleaner is injected from the nozzles. Therefore, dung and food remeining upon the belt are efficiently washed off throughout the entire width of the belt.

From the foregoing, it will be understood that the present invention provides a useful apparatus which supports cages for raising a large number of small animals.

While the invention has been described in conjunction with preferred specific embodiments thereof, it will be understood that this description is intended to illustrate and not limit the scope of the invention, which is defined by the following claims.

What is claimed is:

1. An apparatus for raising small animals, comprising:
   end frame housing disposed at longitudinally opposite ends of said apparatus;
   a plurality of stands disposed at longitudinally spaced intermediate positions between said end frame housings;
   a post mounted upon each one of said plurality of said stands at a central portion thereof with respect to the lateral direction of said apparatus;
   a plurality of vertically spaced brackets secured to each one of said plurality of said posts at vertically spaced positions thereof so as to project in laterally opposite directions with respect to said each one of said plurality of said posts and thereby define a plurality of longitudinally extending, vertically spaced rows of brackets;
   rack members longitudinally disposed between said end frame housings and secured to said plurality of vertically spaced brackets so as to form a plurality of vertically spaced racks;
   cages, for housing said small animals, mounted upon said vertically spaced racks so as to form a plurality of longitudinally extending, vertically spaced rows of said cages;
   a plurality of vertically spaced conveyor belts respectively provided below each one of said longitudinally extending, vertically spaced rows of said cages for receiving bodily discharge and food remains from said small animals;
   a plurality of vertically spaced means disposed within one of said end frame housings for respectively driving each one of said conveyer belts;
   a plurality of vertically spaced means disposed within said one of said end frame housings for respectively cleaning each one of said conveyor belts with respect to said bodily discharge and food remains received thereon; and
   trough collection means defined within a bottom portion of said one of said end frame housings and disposed below the lowermost one of said plurality of vertically spaced conveyor belts for collecting said bodily discharge and food remains removed from said plurality of conveyor belts by said cleaning means.

2. The apparatus according to claim 1, wherein:
   said rack member of each row of said cages comprises a single rack member each of which spans the distance defined between said brackets.

3. The apparatus according to claim 2 wherein each single rack member is formed by bending a steel plate so as to form a bottom plate, side plates bent upwardly at laterally opposite ends of the bottom plate, and a pair of overhung slides upon said side plates.

4. The apparatus according to claim 3 wherein said belt is arranged to slide on said slides and bottom plate.

5. The apparatus according to claim 3 wherein said bottom plate has a plurality of projection each having a spherical top for supporting said belt.

6. The apparatus according to claim 2 wherein said single rack member is detachably mounted on said brackets.

7. The apparatus according to claim 2, wherein:

said driving means comprises a drive pulley.

8. The apparatus as set forth in claim 7, further comprising:
return pulleys operatively engaged with each one of said conveyor belts and disposed within an opposite one of said end frame housings.

9. The apparatus as set forth in claim 8, further comprising:
means disposed within said opposite one of said end frame housings and operaively connected to said return pulleys for adjusting the disposition of said return pulleys with respect to said conveyor belts so as to adjust the tension imposed upon said conveyor belts.

10. The apparatus as set forth in claim 9, further comprising:
tension pulleys disposed within said opposite one of said end frame housings and cooperating with said return pulleys for operatively adjusting the tension imposed upon said conveyor belts.

11. The apparatus according to claim 2 wherein said cleaning means comprises a nozzle provided to inject liquid cleaner onto said belt.

12. The apparatus according to claim 11 wherein said nozzle has an injection projection plane having a rectangular shape.

13. The apparatus as set forth in claim 1, wherein:
said cages are suspendingly supported from said racks.

14. The apparatus as set forth in claim 1, wherein:
said plurality of stands comprises three stands equidistantly spaced with respect to each other between said end frame housings.

15. The apparatus as set forth in claim 1, wherein:
said plurality of vertically spaced brackets comprises eight vertically spaced levels of said brackets disposed upon opposite sides of said posts; and
said plurality of rows of cages supported upon said racks secured to said brackets comprises sixteen rows of said cages.

16. The apparatus as set forth in claim 15, wherein:
said plurality of conveyor belts and said conveyor belt driving means comprises sixteen conveyor belts and sixteen driving means.

17. The apparatus as set forth in claim 1, wherein:
said cleaning means comprises rotary brush means operatively engaged with an outer surface of each one of said conveyor belts for removing said bodily discharge and food remains from said each one of said conveyor belts.

18. The apparatus as set forth in claim 1, wherein:
said cleaning means comprise scraper means operatively engaged with an outer surface of each one of said conveyor belts for removing said bodily discharge and food remains from said each one of said conveyor belts.

19. The apparatus as set forth in claim 1, further comprising:
means provided upon each onr of said plurality of stands for adjusting the height thereof.

20. The apparatus as set forth in claim 1, further comprising:
tension pulleys disposed within said one of said end frame housings for adjusting the tension imposed upon said conveyor belts driven by said conveyor belt driving means.

* * * * *